United States Patent [19]

Klosterhuber et al.

[11] Patent Number: 4,577,956
[45] Date of Patent: Mar. 25, 1986

[54] PROCESS FOR THE CHAOTIC FILMING OF DOCUMENTS AND DEVICE FOR THE COMPLETION THEREOF

[76] Inventors: Rolf Klosterhuber, Stieglitzweg 17, D-8033 Krailling; Wolfgang Herrle, Hohenzollernstr. 14, 8000 Müchen 40, both of Fed. Rep. of Germany

[21] Appl. No.: 500,710

[22] Filed: Jun. 3, 1983

[30] Foreign Application Priority Data

Jun. 3, 1982 [DE] Fed. Rep. of Germany ....... 3220977
Feb. 3, 1983 [DE] Fed. Rep. of Germany ....... 3303647

[51] Int. Cl.$^4$ ............................................. G03B 27/52
[52] U.S. Cl. ......................................... 355/40; 355/64
[58] Field of Search ........................ 355/40, 41, 64, 65

[56] References Cited

U.S. PATENT DOCUMENTS 3,645,619  2/1972  Burton et al. ........................ 355/40
4,050,810  9/1977  Broderick et al. .................. 355/40
4,116,560  9/1978  Dragani et al. ...................... 355/41

FOREIGN PATENT DOCUMENTS 1260295  2/1968  Fed. Rep. of Germany .
2707597  8/1977  Fed. Rep. of Germany .

Primary Examiner—Monroe H. Hayes
Attorney, Agent, or Firm—Sughrue, Mion, Zinn, Macpeak & Seas

[57] ABSTRACT

The invention concerns a process for the chaotic filming of documents in which the latter are equipped with a first code, and then in unordered sequence are filmed with the application of a pulse code, wherein of the first code applied respectively on the documents fed for filming at least the address is detected and intermediately stored, the pulse code on the exposed film is detected and continuously added up, and the number corresponding to the image of the relevant document in the pulse code and the address of the first code are jointly stored as the image address.

According to a first embodiment the documents are paged in unordered sequence and then filmed with the allocation of a blip pulse code. According to a second embodiment, documents are provided with the code allocated respectively by a computer, whereby the computer contains the code and optionally further information in store. The documents are then filmed in unordered sequence with the simultaneous application of a pulse code, using a camera. In addition a device is proposed for the completion of this process.

34 Claims, 2 Drawing Figures

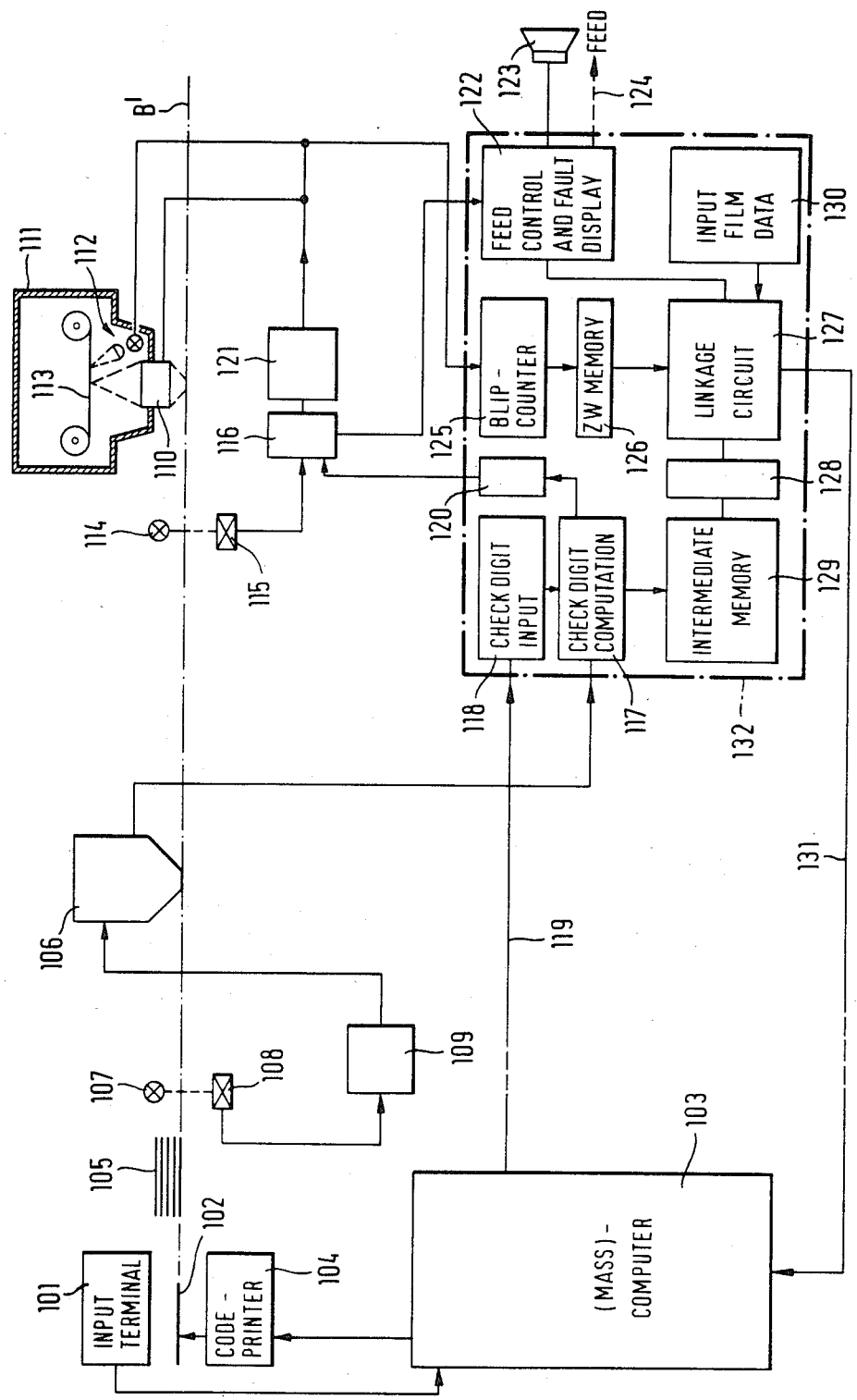

PROCESS FOR THE CHAOTIC FILMING OF DOCUMENTS AND DEVICE FOR THE COMPLETION THEREOF

BACKGROUND OF THE INVENTION

The invention concerns a process for the chaotic filming of documents in which the latter are equipped with a first code and then in unordered sequence are filmed with the application of a pulse code, as well as a device for the completion of said process.

For reasons of space-saving and increased access speed, the filming of written documents for archival purposes has grown considerably in recent years. The conventional processes of the type described make possible the supplementation of respectively filmed files by newly arriving documents. Together with a subsequent EDP detection of the filmed documents in this way ideal filing becomes possible if no errors are made in the filming and the EDP detection. But this is regrettably not always the case. On the contrary it has been found that even with this type of filing, the errors of the traditional methods of document storage in files, suspended registries etc. still continue, i.e. wrong filing, uncontrolled removal, mistakes, wrong registration, wrong document report coverage, etc. The resultant errors in the case of chaotic microfilming amount on average to 4 to 6% of the total document filing on film material.

SUMMARY OF THE INVENTION

The present invention is based on the object of avoiding to a far-reaching extent the errors ocurring during the chaotic filming of documents. This object is inventively attained in that of the first code applied on the documents respectively fed for filming at least the address is detected, and intermediately stored, in that the pulse codes exposed on the film are detected and continuously added, and in that the number of the pulse code corresponding to the image of the relevant document and the address of the first code are jointly stored as the image address.

The invention is especially suitable for a chaotic filming of documents in which the latter are paged in unordered sequence and then are filmed with the allocation of a blip pulse code.

A preferred embodiment of this process is characterized in that of the numerical sequence set in the paging member at least the figures corresponding to the image address on each film are stored, in that the blip pulses exposed on the respective film are continuously registered, added up, and intermediately stored, and in that when exposing the film with the respective document the numerical sequence transferred to it from the paging member is compared with respect to the image address with the blip number corresponding to this photograph for identity,. In this way the clear allocation of document and image address to the film is ensured.

It has been found to be especially favorable when, where identity is lacking between the numerical sequence transferred from the paging member with respect to the image address and the blip number corresponding in order to this photograph, the filming process is automatically interrupted.

The documents are expediently force-fed between the paging member and the camera taking the film. By a visual or an acoustic display of the type of error ocurring during paging and filming, it is additionally provided with that the corresponding errors are easily corrected and the wrongly addressed document is properly filed in a repetition of the filming process.

According to a further especially favorable embodiment of this process, in the event of lacking identity between the numerical sequence transferred from the paging member with respect to the image address and the blip number corresponding to this photo, the relevant document is separately ejected and/or equipped with markings which show the operaor that for that document a new paging and filming must be implemented.

The error rate can be further reduced if the insertion of the paged documents in the camera is checked and a blip pulse is applied on the film only when a document's presence has been established. If the next document does not arrive at the camera within a certain time interval, the filming process is expediently interrupted automatically. In order to ensure that in the further filming after a stoppage there are no difficulties with the allocation of the image address, it is advisable to move the paging member ahead depending on the total number of blips on the film.

In a further especially preferred embodiment of this process, the numerical sequence set in the paging member and required for documentation is fed to a computer, which detects therefrom a check digit which is additionally paged on said document. Expediently the detection of the check digit and the adjustment of the paging number are effected by the same computer which also determines the check digit.

The application of the check digit simplifies during the further processing of the filmed documents the coverage of the latter in an EDP installation, whether directly from the paged documents or from the film, since when feeding these data into the computer it can easily be checked by using a corresponding program from the check digit whether due to an oversight number rotational or number transmission errors have been made, so that they can almost wholly be eradicated.

It has been found that it is especially suitable when the check digit is determined by module 11.

To make the process still more certain, preferably the application of the paging number set in the paging member on each document is checked before its onward transport to the camera.

An inventive device for the completion of this process contains a memory, to which the numerical sequence set in the paging member is fed, an intermediate memory to which the number of blip pulse recorded on the film is fed, and adjustable delay member which is interposed between the memory and the intermediate memory, as well as a comparator for comparison of the signals fed to the memory and/or to the intermediate memoy at certain timed intervals, as well as a computer for the determination of the next paging number, which is in operative connection with the adjuster device of the paging member.

It is expedient to use a second computer the functions of which under certain circumstances can also be combined with those of the first computer, to determine a check digit from the numerical sequnce set in the paging member, to which a control circuit is connected for the actuation of an additional numerical wheel in said paging member.

The invention is further especially suitable for a process for the chaotic filming of documents which are provided with a code respectively allocated by a computer, wherein said computer contains the code and optionally further stored information, and the documents are in unordered sequence with the simultaneous application of a pulse code, by means of a camera.

The preferred embodiment of this second process is characterized in that the code on the relevant document fed to the camera for filming is read, and at least its computer address is stored, in that the pulse code exposed on the film is continuously added up, and in that the image address thus obtained is added to the code stored at least with respect to its computer address and is transferred to the computer as well as being stored there with the code and optional further information.

It is expedient when the added pulse codes are combined with signals which identify the film number and/or date and other film parameters to form an image address. The image address is expediently intermediately stored before its addition to the computer address.

It has been found especially favorable when the documents are force-fed between the processing station reading the codes and the camera taking the film.

To reduce the error rate still further a pulse code only applied to the film when between the detection of the code and the arrival of the document to be filmed in the camera, a definite time period has elapsed. This prevents, on loss of documents during a stoppage in the feed thereof from the scanner to the camera, any wrong allocation of the pulse code. To avoid possible errors in reading the code, which may arise especially when the code is fouled or damaged during handling of the documents, the code is allocated a check digit in the computer which issues it, while after reading of the code and before the storage of at least the computer address its correctness is checked by means of a check digit computer. The filming process is automatically interrupted if after the lapse of a certain interval no pulse code has been issued or the code read is wrong. The type of the error arising during filming is advantageously displayed visually or acoustically and/or the relevant document is ejected. After a manual correction of the error or a new allocation of the code the document is then again fed to the microfilming means.

For the automatic reading of the code it has been found favorable when the code contains a line code, optionally apart from a numerical and/or letter code, which can be visually detected. This applies especially when the reading of the code is done by a scanner, preferably a laser scanner.

The inventive device for the completion of this second and preferred process contains a camera, which is provided with a device for the selective issue of a pulse code recordable on the film, a force-feed for the documents to be filmed and a computer which allocates a code to each document, as well as a scanner arranged before the camera which reads the code on said document. A first intermediate memory is fed with the signals detected by said scanner. A second intermediate memory sums up the pulse code stored, on the film. A linkage circuit is connected with the intermediate memories so that it links the signals coming from the first and second intermediate memories and conveys them to the computer for storage.

Advantageously the computer is designed so that it allocates in the manner known per se a check digit to the code, while in this case between the scanner and the first intermediate memory a check digit computer is placed which checks on the correctness of the code read by said scanner. In a preferred development the device contains a delay member via which the signal delivered by the scanner, preferably after checking, is fed to a comparator at which a light barrier is arranged in the path of the document in its filming position in the camera so that the output signal of the comparator controls the shutter of the camera and/or the device for the issue of the pulse code and/or the transport of the documents.

Between the comparator and the shutter and/or the device for the issue of a pulse code, it is expedient to position a delay member. Especially when the code includes a line code, it is favorable to use a laser scanner as the scanner, since thereby rapid and correct reading of the code can be attained.

For the issue of the pulse code allocated to the image of the document on the film, there is in the area of the camera in one advantageous embodiment a light source which provides the blip pulses on the film.

For rapid filming of the consecutive documents it is advisable to place an adjustable delay member between the first intermediate memory and said comparator.

BRIEF DESCRIPTION OF THE DRAWINGS

The enclosed drawings of two preferred embodiments are intended for further explanation of the invention.

FIG. 2 shows schematically a second embodiment of a device for the chaotic filming of documents.

DETAILED DESCRIPTION OF THE PREFERRED EMBODIMENTS

Figure 1:
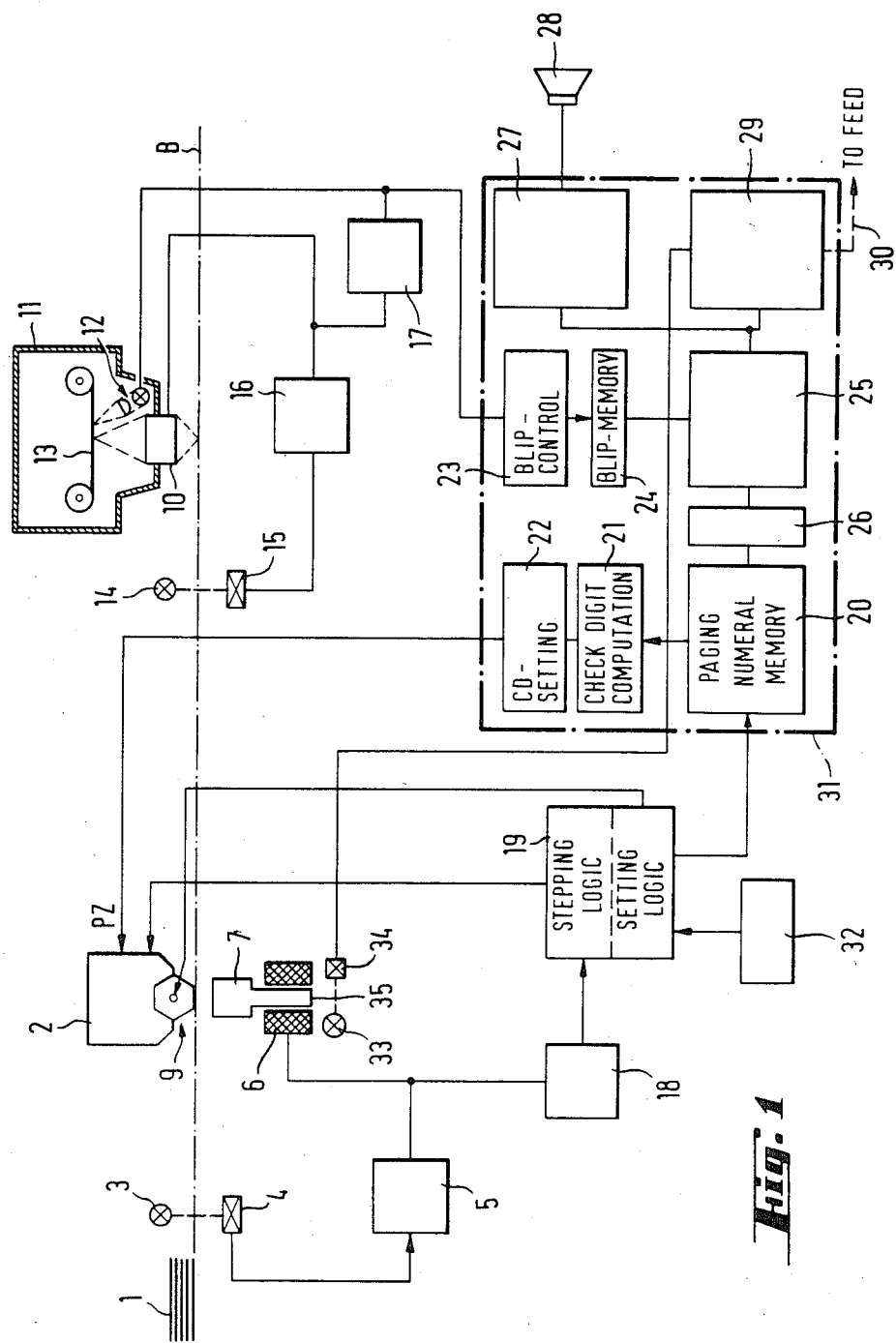
FIG. 1 shows schematically a first embodiment of a device for the chaotic filming of documents.

In the chaotic filming of documents shown in FIG. 1, documents taken in nonselected manner from a stack are fed, by an intake not shown, individually and consecutively to a paging member 2 whereby they pass a light barrier which is formed by a light 3 and a photoelectric cell 4. The output signal of the photocell 4 arrives via a control circuit 5 with adjustable time delay at an actuating magnet 6 for a hammer 7, so that the latter is actuated after a certain time has passed since the document 1 has passed through said light barrier. Hammer 7 strikes in the direction of a stamping unit 9, so that the document is printed between unit 9 and said hammer 7. The document 1 is then grasped by a force-fed (Not shown in the drawing) and is moved in front of the shutter 10 of a camera 11, along the broken line B which shows the path of the documents. The camera contains in its interior a schematically indicated blip setter 12, consisting of a briefly illuminable light source and a corresponding lens, which places a blip on the film 13 next to the photograph of the respective document 1, which in the manner known per se enables the operator to locate the image address on the film when the document is needed again.

The control of the camera shutter 10 and the actuation of the blip setter 12 is done by a further light barrier which consists of a light source 14 and a photoelement 115. The output signal of said photo-element 15 actuates a control circuit 16 and, via a further control circuit 17, the blip setter 12, while the control circuits 16 and 17 each effect a timing delay.

The output signal of the control circuit 5 is further fed via a delay circuit 18 to a setting and stepping logic 19, which effects the setting of stamping unit 9 and the stepping thereof after each paging process. The setting and stepping logic 19 is also operatively connected with a paging number memory 20, from which a check digit computer 21 obtains the relevant paging number and front it, using a suitable algorithm, computes a check digit, which is fed via a check digit setting logic 22, as shown by the arrow PZ, to an additional stamping wheel of the paging member 2.

The output signal of the control circuit 17 is further fed to a blip counter 23 and to an intermediate memory 24 connected thereto. A comparator 25 is operatively connected with intermediate memory 24 as well as with paging number memory 20, while a delay circuit 26 compensates for the time elapsed between the paging process in the paging member 2 and the exposure process in the camera 11 for the same document, so that by a comparison of the two it is ascertained that the numerical sequence corresponding to the address of the document also corresponds in the paging number to the corresponding address on film 13. If identity is lacking, the comparator 25 produces an output signal which on the one hand is sent to an error detector 27, which actuates an optical or an acoustic display unit 28, and on the other hand to a logic 29, which as indicated by the broken arrow 30, affects the feed of the documents and automatically stops the entire installation. The frame 31 shows that the components 20 to 27 and 29 have been combined into one unit.

Reference numeral 32 indicates a terminal which effects a manual operation of the setting and stepping logic 19, so that at the start of filming, the paging number can be set and also if required arbitrary adjustments to the paging number can be made.

A further light barrier formed by a light source 33 and a photocell 34, into the path of which a stud 35 of the hammer 7 projects, ensures that the paging number set in the stamping unit 9 including the check digit is transferred by the action of the hammer to the document 1. The signal issued from photocell 34 is supplied to the logic 29, so that if a corresponding error occurs, the installation will also be stopped.

Below the second example of an inventive chaotic microfilming process for documents is explained in more detail on the basis shown in FIG. 2.

Via an input terminal 101, special data of a single document 102 are sent to a mass computer 103, which optionally with the addition of further data already stored in connection with the document 102 determines a code for the document 102. This contains, apart from other data a corresponding computer address and a check digit computed in accordance with a certain modulus from said code. From mass computer 103 the code with the check digit is sent to a code printer 104, which prints the code and the check digit directly on the document, or is passed with a punch or on a corresponding sticker which is attached to the document. As a rule the code is also printed in visually readable clear text, i.e. letters and/or numbers as well as in an easily readable form for the scanner, e.g. as a line code. The document with the code therein is then collected with other correspondingly coded documents and is led as a stack 105 to the microfilming means.

From the stack 105 documents in unordered selection are fed, by an intake not shown, individually and consecutively to a laser scanner 106, wherein they pass a light barrier which is formed by light 107 and a photocell 108. The output signal of photocell 108 arrives via a control circuit 109 with adjustable time delay at the laser scanner 106, which reads the code on the document. The code is then grasped by a force-feed not shown in the drawing and is transported before the shutter of a camera 111 along the broken line B which indicates the path of the document. Camera 111 contains a schematically shown blip setter 112 within it, consisting of a briefly illuminable light source and a corresponding lens, while said blip setter 112 sets a blip on the film 113 next to the photograph of the respective document 102, which makes possible in the manner known per se the location of the image address on the film when the document is again sought.

The control of the camera shutter 110 and the actuation of the blip setter 112 are done by a further light barrier which is formed of a light source 114 and a photoelement 115. The output signal of photoelement 115 is fed to the input of a comparator 116. The output signal obtained from the laser scanner 106 is fed to a check digit computer 117. The check digit computer 117, via a check digit input 118, which as indicated by the line 119 can optionally be controlled by the mass computer directly, is then adjusted to the algorithm used in the computer for the determination of the check digits, so that it is able to check the code read by the laser scanner 106 for its correctness. The corresponding output signal of the check digit computer 117 is fed via an adjustable delay member 120 to a further input of the comparator 116.

If the signal fed from the photoelement 115 to the comparator 116 and the signal fed from the check digit computer 117 via the delay member 120 to comparator 115 arrive coincidentally and the signal supplied from check digit computer 117 simultaneously shows that the code has been read correctly, comparator 116 sends a control signal which via the delay circuit 121 actuates the shutter 110 and the blip setter 112. Otherwise an error display signal is fed from the comparator 116 to a feed- and error display control 122. The feed- and error display control actuates an optical or an acoustic display unit 123 as well as a further logic not shown, which as indicated by the broken arrow 124 affects the feed of the documents and automatically stops the entire unit.

The control signal coming from the delay circuit 121 and/or feedback signal of blip setter 112 are further fed to a blip counter 125 and to an intermediate memory 126 connected thereto. A linkage circuit 127 is operatively connected with the intermediate memory 126, as well as via a delay circuit 128 with the further intermediate memory 129, which stores temporarily from the code signal checked by the check digit computer 117 at least the computer address thereof.

The delay circuit 128 compensates for the time elapsed between the reading of the code and the exposure process in the camera 111 for the same document, so that it is ascertained that the image address found by the blip number of the document also corresponds to the corresponding computer address of the relevant document. The image address can be supplemented by further data, e.g. by the reel number of the film, the date of filming etc., which are fed in via a terminal for the input of data 130 in the linkage circuit 127. The code signal stored with respect to at least the computer address in the intermediate memory 129 which is connected in the linkage circuit 127 with the image address signal, is then fed as shown by the line 31 to the mass computer 103, which then stores the image address so that it can be recalled with or via the code. Frame 132 means that the components 117, 118, 120, 122, 125–130 have been combined into one unit.

We claim:

1. Process for the chaotic filming of documents in which the documents are provided with a first code and then in unordered sequence are filmed with the application of a pulse code, characterized in that of the first code applied on the document respectively guided for filming at least the address is detected and is intermediately stored, in that the pulse codes exposed on film are detected and continuously added and in that the number corresponding to the image of the respective document of the pulse code and the address of the first code are jointly stored as the image address, in which said documents are paged in unordered sequence and are then filmed with allocation of a blip pulse code, characterized in that of the numeral sequence set in the paging member, at least the figures corresponding to the image address on the rspective film are stored, in that the blip pulses exposed on the rspective film are continuously registered, added up, and intermediately stored and in that when exposing the film with the respective document, the numeral sequence transferred to it from the paging member is compared with respect to the image address with the blip number corresponding to this image for identity.

2. Process according to claim 1, characterized in that the documents are force-led between the paging member and the camera taking the film.

3. Process according to claim 1, characterized in that when identity is lacking between the numerical sequence transferred from the paging member with respect to the image address and the blip number ordinarily corresponding to this image, the filming process is automatically interrupted.

4. Process according to claim 3, characterized in that the type of the error arising in paging and filming is displayed visually or acoustically.

5. Process according to claim 1, characterized in that when identity is lacking between the numerical sequence transferred from the paging member with respect to the image address and the blip number ordinarily corresponding to this image, the corresponding document is separately ejected and/or is marked showing the operator that for that document new paging and filming must be carried out.

6. Process according to claim 1, characterized in that the insertion of the paged document in the camera is checked, and in that the application of the blip pulse on the film is only effected when a document is present.

7. Process according to claim 6, characterized in that when the subsequent document fails to arrive in the camera within a predetermined interval in time, the filming process is automatically interrupted.

8. Process according to claim 1, wherein the paging counter is moved ahead depending on the total number of blips applied on the film.

9. Process according to claim 1, wherein the numerical sequenceneeded for documentation and set in the paging member is fed to a computer, which derives from it a digit check, which is additionally paged on said document.

10. Process according to claim 9, wherein the detection of the digit check and the adjustment of the paging number are controlled by the computer which determines the digit check.

11. Process according to claim 1, characterized in that the application of the adjusted paging number on the respective document is checked before it is transported onwards.

12. Process for the chaotic filming of documents in which the documents are provided with a first code and then filmed in unordered sequence with a camera under simultaneous allocation of a pulse code, wherein said first code is read and then conveyed together with the pulse code of said image address to a computer, characterized in that the filming of said documents is done with a time delay as compared to reading said first code, that said first code is subjected to a plausibility control regarding a predetermined model after it has been read and during the delay period, and that the plausibility-controlled first code controls the pulse code release and/or the release of the camera shutter and/or the document transport.

13. Process according to claim 12, characterized in that said transport of said documents is checked from the position at which said first code is being read until the position desired for taking the picture in the camera is reached.

14. Process according to claim 13, characterized in that the documents are forcibly guided between the processing station reading the first code and the camera photographing the documents.

15. Process according to claim 12, characterized in that the pulse code is only applied to film when between detection of the code and the arrival of the document to be filmed in said camera, a certain time interval has elapsed.

16. Process according to claim 12, characterized in that the filming process is automatically interrupted when after the lapse of a certain interval no pulse code has been issued, or when the code checked has been proven to be wrong.

17. Process according to claim 16, characterized in that the type of error occurring during filming is displayed visually or acoustically and/or that the corresponding document is ejected.

18. Process according to claim 12, wherein the added pulse codes are combined with signals which identify a film number and/or date for other film parameters to form an image address.

19. Process according to claim 12, characterized in that the shutter release and/or the application of said pulse code are checked and that the image address together with the first code is only fed to the computer after these steps have been effected.

20. Process according to claim 12, characterized in that said first code is allocated to the document by a computer containing in its memory said first code together with further data, if necessary, so that said first code, provided it is read, contains the storage address in that computer, that at least said storage address is read when reading said first code and that said first code is linked with said pulse code of said image address, fed to the computer by means of that part of said first code containing said storage address, and then stored at the storage address of said first code.

21. Process according to claim 20, wherein the image address is intermediately stored before its addition to the computer address.

22. Process according to claim 12, characterized in that said pulse code is formed by blip pulses which are continuously added.

23. Process according to claim 12, characterized in that the first code contains a bar code.

24. Process according to claim 12, characterized in that the reading of the first code is effected by means of a scanner.

25. Process according to claim 24, wherein said scanner is a laser scanner.

26. Device for chaotic filming of documents which are provided with a first code, comprising a camera (111) which is fitted with a device (112) for selectively issuing a pulse code recordable on the film, a force feed for the documents to be filmed, a scanner (106) in front of said camera (111) which reads the first code on said document (102), a check computer (117) to which signals from the scanner (106) are fed, said check computer controlling a device for actuating said camera (111) and/or the device (112) for the selective issuing of a pulse code and feeding a signal to a first intermediate memory (129) connected to the check computer (117), a second intermediate memory (126) which adds up the pulse codes recorded on the film, and a linkage circuit (127) which links incoming signals from the first and second intermediate memories (129,126) and conveys them to a computer (103) for being stored in it.

27. Device according to claim 26, in which the computer (103) sets the first code allocating at the same time to it plausibility criteria to a given model.

28. Device according to claim 26, characterized by a delay circuit (120) via which the signal delivered by the scanner (106) after being checked by the check computer (117) is feedable to a comparator (116) to which further a light barrier (114,115) in the path of the document in its imaging position in the camera (111) is connected so that the output signal of said comparator (116) controls the shutter (110) of the camera and/or the device (112) for the issue of the pulse code and/or the transport means (124) for the documents (102).

29. Device according to claim 28, characterized in that between the comparator (116) and the shutter and/or the device (112) for the issue of a pulse code, a delay member (121) is interposed.

30. Device according to claim 26, characterized in that said scanner (106) is a laser scanner and/or the code contains a bar code.

31. Device according to claim 26, wherein the device (112) for the issue of the pulse code contains an intermittently operable light source for the issue of blip pulses on the film.

32. Device according to claim 26, wherein an adjustable delay member (128) is interposed between the first intermediate memory (129) and the linkage circuit (127).

33. A device for the chaotic filming of documents in which the documents are provided with a first code including an address and then in unordered sequence are filmed with the application of a pulse code, said device including paging means for paging said documents in accordance with a numeral sequence including image address information corresponding to the image address of a document on the respective film, means for intermediately storing said image address information, filming means for filming said documents with the allocation of a blip pulse code, means for continuously registering, adding up and intermediately storing the blip pulses exposed on the respective film, comparison means for, when exposing the film with the respective document, comparing said image address information with the blip number corresponding to a particular image for identity, and means for jointly storing the number corresponding to the image of the respective document of the pulse code and the address of the first code as an image address, said device further including an adjustable time delay member switched in between the memory and the intermediate memory when the path for the documents between the paging means and the exposure station exceeds a certain length, said comparison means including a comparator for the comparison of signals fed at certain time intervals to said memory or to said intermediate memory, and said device further including a counter for the automatic adjustment of the next consecutive paging number which is operatively connected with the adjustment device of said paging member.

34. Device according to claim 33, further comprising a computer for the determination of a check digit from the numerical sequence set in the paging member, and a control circuit connected to said computer for actuating an additional numerical wheel in said paging member.

* * * * *